(12) United States Patent
Rajala et al.

(10) Patent No.: US 6,492,799 B1
(45) Date of Patent: Dec. 10, 2002

(54) MONITOR CIRCUIT FOR A CURRENT LIMITING DEVICE

(75) Inventors: Erkki Rajala, Vaasa (FI); Ralf Strümpler, Gebenstorf (CH); Timo Jokiniemi, Vaasa (FI)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 09/762,943

(22) PCT Filed: Jun. 13, 2000

(86) PCT No.: PCT/CH00/00321

§ 371 (c)(1),
(2), (4) Date: Feb. 14, 2001

(87) PCT Pub. No.: WO00/79665

PCT Pub. Date: Dec. 28, 2000

(30) Foreign Application Priority Data

Jun. 17, 1999 (EP) .............................................. 99810537

(51) Int. Cl.[7] .......................... G01R 25/00; H02H 9/00; H02H 5/04
(52) U.S. Cl. ........................... 324/86; 361/58; 361/106
(58) Field of Search ..................... 324/86, 107; 361/27, 361/58, 106

(56) References Cited

U.S. PATENT DOCUMENTS

| 4,281,322 A | | 7/1981 | Nasu et al. |
| 4,514,723 A | | 4/1985 | Leal |
| 5,530,613 A | * | 6/1996 | Bauer et al. .................. 361/27 |
| 6,038,117 A | * | 3/2000 | Dullni et al. ............... 361/127 |

FOREIGN PATENT DOCUMENTS

| DE | 41 18 346 C1 | 9/1992 |
| DE | 43 13 443 C1 | 1/1994 |
| EP | 0 655 760 B1 | 5/1995 |
| EP | 0911853 | 4/1999 |

* cited by examiner

*Primary Examiner*—N. Le
*Assistant Examiner*—James Kerveros
(74) *Attorney, Agent, or Firm*—Burns, Doane, Swecker & Mathis, L.L.P.

(57) ABSTRACT

An electrical monitor circuit in which star points of taps on a first and a second side of a three-phase current limiting device are voltage compared. Possible applications are combinations with electrical switches, especially for power supplying and protecting circuits for electrical motors.

18 Claims, 5 Drawing Sheets

MONITOR CIRCUIT FOR A CURRENT LIMITING DEVICE

FIELD OF THE INVENTION

This invention relates to an electrical monitor circuit for monitoring a status of a three-phase current limiting device. The current limiting device is intended to limit or interrupt a current in a three-phase line. Consequently, the current limiting device comprises three one-phase current limiting means, one for each one-phase line.

The monitor circuit according to the invention is intended to monitor whether the current limiting device is in its normal conducting, i.e. relatively low resistance status or whether there is any current limiting or current interrupting effect of the current limiting device present.

RELATED ART

A prior art solution concerning monitoring of a current limiting device is shown in DE 43 40 632 A1. Therein, the voltage across a PTC resistor being connected in series with a load break switch is used to trigger the opening of the load break switch. The PTC resistor is intended to improve the current limiting capability of the load break switch which finally interrupts the current.

What is also known are means to optically signalize that a thermal fuse has blown. These conventional proposals mainly relate to circuits in automobiles and are shown e.g. in U.S. Pat. Nos. 4,281,322, 4,514,723 and EP-A 0 911 853.

D 41 18 346 shows a monitor circuit for monitoring fuses in a three-phase line. This monitor circuit comprises two star points, each star point being connected to three respective taps on one respective side of the fuses and each star point relating to one side. In order to detect failure of all three fuses, additional circuitry between one of the star points and the corresponding side of the fuses is provided.

Also DE 42 13 443 shows a monitor circuit using taps on each side of fuses in a three-phase line. The circuitry connected to each one of both sides of the fuses is described as a triangle circuit, respectively.

Finally, U.S. Pat. No. 5,530,613 describes series connections of PTC-polymer current limiters and contactors controlled by control circuits responsive to the voltage across the PTC-polymer current limiters. Alternatively, series connections of PTC-polymer current limiters, contactors and circuit breakers are mentioned.

SUMMARY OF THE INVENTION

The technical problem underlying the present invention is to provide a simple electrical monitor circuit for monitoring a status of a three-phase current limiting device with improved efficiency.

According to the invention, this technical problem is solved by means of an electric monitor circuit for monitoring a status of a three-phase current limiting device for a three-phase line comprising three one-phase current limiting means, that circuit comprising: six taps, one respective tap for a first and a second side of each current limiting means, said taps being divided into two groups of three taps each; two star points, said three taps in each group being connected to one respective star point for each group via a respective resistor; and a voltage detector for detecting a voltage between said star points and producing a signal responsive to said voltage difference, characterized in that two taps on a first side of said current limiting device and one tap on a second side of said current limiting device are connected to one of said star points.

Further the invention relates to an apparatus for interrupting an electrical current in an electrical line, comprising an electrical monitor circuit as defined above, said three-phase current limiting device, a switch in said three-phase line and in series connection with said three-phase current limiting device, wherein said monitor circuit is adapted to, in case of a resistance change of at least one of said single-phase current limiting means, detect said voltage for a predetermined time period after said change and produce said signal only if said resistance change is present for said time period, to open said switch.

Still further, the invention relates to a circuit for power supplying and protecting an electrical motor comprising a monitor circuit or an interrupting apparatus as defined above.

One idea of the invention is that in a three-phase circuit it is generally not important in case of tripping of at least one of three one-phase current limiting means, to know which or how many current limiting means have tripped. To the contrary, it simplifies the monitor circuit and the structure of the signals to be produced by the monitor circuit, if there is only one signal indicating the tripping of anyone of three one-phase current limiting means. I.e. the status of the three-phase current limiting device is differentiated between a normal status in which ail current limiting means are normally conducting, and a triggered status in which one of them is triggered.

Therefore, the invention provides a voltage measurement between two star points, each of which combines three respective taps. These in total six taps are distributed on the three single phase current limiting means, one tap on each side of each means. Thereby, triggering of one of said means leads to an increase of the voltage between both star points and can thus be detected and used to produce a signal indicating the triggered status.

According to the invention, one star point is a combination of two taps of one side and one tap of the other side of said three-phase current limiting device, the other star point being a combination of the remaining three taps, again two on the latter and one on the former side. The advantage of the circuit design is that the monitor circuit is responsive equally to triggering of anyone, any two or all three single phase current limiting means and that the circuit design is remarkably simple.

If all resistors connecting the taps with their respective star point have equal values within each group, the voltage detected will be substantially zero in the normal conducting state of the current limiting device and different from zero in any other case, i.e. in the triggered status.

The signal produced responsive to the status of the current limiting device can be used for signalizing purposes only, e.g. for controlling a display, lamp etc. or for information of a remote control and supervision center. Preferably however, the monitor circuit according to the invention feeds said signal to a control circuit in order to control a three-phase switch in said monitored line. According to the basic idea of the invention, the switch is opened according to the signal, i.e. independently from which one of the single-phase current limiting means has triggered. In any case of triggering the switch is opened for all three lines. This function is advantageous for any application wherein a remaining one or remaining two phases must not be active in case of the triggering of another phase.

This applies especially to a preferred application of the invention in a circuit for power supplying and protecting an electrical motor. A three-phase motor can be destroyed if operated by only one or two phases. Therefore, the invention provides an important advantage over the mere application of independent single-phase current limiting devices in motor circuits.

The control circuit can be power supplied from the three-phase line. One possible realization is a combination of two taps in the three-phase line with a rectifier circuit. If the security aspect of a galvanic separation is important, an isolating transformer can be used, e.g. on the AC side of the above rectifier circuit.

A suitable choice for the three-phase switch is a load break switch, switch fuse and/or contactor. A regular circuit breaker is usually not necessary because of the limiting effect of the current limiting device. However, also a circuit breaker could be provided for in order to have a safe breaking capability in case of a failure of the current limiting device.

For the measurement it is preferred to introduce a galvanical separation between the control circuit controlling the switch and the starpoints in order to avoid disturbances of the formers potential by the latter. One preferred realisation of such a galvanic separation is an optical coupling, e.g. by a combination of a light emitting diode (LED) and a photo diode. Also, a security aspect can be relevant here.

In order to provide for said response time period, a capacitor and a resistor can be provided within the control circuit This has also proven to be an efficient measure especially for noise occurring during start up of an electrical motor. Reference is made to the following description of the embodiment.

In order to prevent a triggering of the voltage detector by very short disturbances and noise in the three-phase line that do not lead to a limiting effect of the current limiting device, it is also effective to provide for an another capacitor, additionally or alternatively, between both star points. Also the charging delay time of this capacitor can provide for a voltage buildup between the star points over said time period and thus for said time continued detection by the voltage detector.

As mentioned above, the signal produced responsive to the voltage detection according to the invention can be used also for signaling purposes instead of opening a switch. Further, both functions can be combined, e.g. by including a light emitting device such as a LED in the control circuit. Or by fitting the signal to a remote control center besides local action in terms of opening a switch.

So far, the term "current limiting device" has been used in its generality in order to demonstrate that the invention works with the variety of special embodiments for this device. However, the most common and commercially important embodiment is a set of three thermal fuses, each for one phase. A fuse is in fact more than a current limiting device, actually a current interrupting device. However, this is not essential for the invention. Accordingly, in this application the term current limiting also includes a limitation to zero. In case of thermal fuses, it is preferred to open at least one three-phase switch at a high voltage side of the fuses, more preferably two three-phase switches, each on one side of the fuses, it can be guaranteed by opening the switch(es) that the contacts in which the fuses are mounted and in which a replacement has to be effected, are free of any harmful potential.

Another preferred choice for the current limiting device is a set of three PTC resistors, especially PTC-polymer resistors.

PTC resistors are current limiting means in the sense that they are able to limit a current to small or very small values within a very short response time. However, they do not really provide for a galvanic interruption of the current as a thermal fuse does. Therefore, PTC resistors can advantageously be combined with conventional switches, e.g. a switch fuse or load break switch and/or a contactor, in order to improve the response time and thus the limiting capability of the switch and simultaneously provide for a galvanic interruption at least in cases in which this proves to be necessary. Consequently, the invention also relates to an apparatus for interrupting an electrical current with a three-phase current limiting device, especially a three-phase PTC resistor, and a switch in series connection, wherein the triggering of the current limiting device, i.e. a change from the PTC's low resistance status to its high resistance status, is detected by means of the star point voltage for a certain time period. By choosing appropriate values for the pacitance of the capacitors and the resistance of the resistor, the time period can be predetermined.

In any case, voltage disturbances and noises of short time extension can be "filtered off" and do not lead to an opening of the switch. On the other hand, if the high voltage across the PTC resistor is present over said time period, it can be concluded, that a serious fault has been detected leading to an opening of the switch. For further details of this interrupting apparatus, reference is made to the embodiment of the invention as described below.

The contactor can also be a microrelais switch.

As already mentioned above, the electric monitor circuit according to the invention—as well as the interrupting apparatus just described—can be used in a power supplying and protecting circuit for an electrical motor.

DESCRIPTION OF PREFERRED EMBODIMENTS

In the following, the invention will be described with reference to the figures which show preferred embodiments of the invention.

The preceding as well as the following description of this invention has to be understood as disclosing the invention as apparatuses and circuits as well as disclosing their respective operating methods.

FIG. 1 shows a schematic circuit diagram of a monitor circuit according to the

The invention will be described with embodiments being power supplying and protecting circuits for an electrical motor. However, all these power supplying and protecting circuits include a monitor circuit according to the invention, the common structure of which is principally shown in FIG. 1.

The monitor circuit is referenced with numeral 1. Monitor circuit 1 monitors three single-phase PTC resistors PTC1–PTC3 shown in the left hand side of FIG. 1. Fuses could be used instead, which are common in motor protecting systems. A main difference is that PTC resistors are resetable, i.e. need not be exchanged after tripping. Using fuses instead of PTC resistors, however, does not change the structure at all.

PTC resistors PTC1–PTC3 are connected in a respective single phase line $L_1$, $L_2$ and $L_3$, respectively, which form a three-phase line L. Line L leads to an electrical motor M, wherein the part between PTC resistors PTC1–PTC3 is distinguished by an apostrophe from the part on the other side of resistors PTC1–PTC3.

Figure 1:
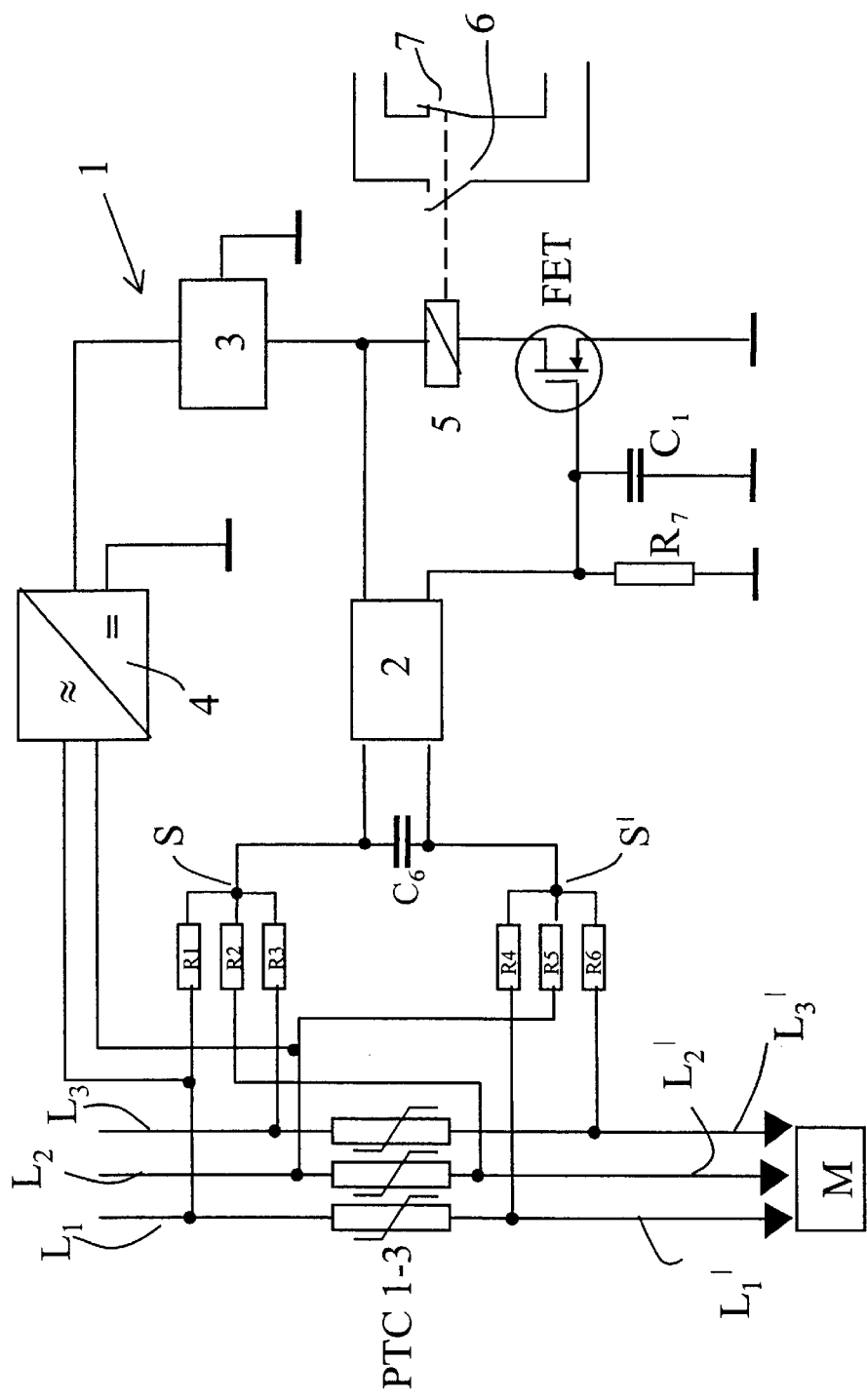

FIG. 1 shows that respective taps at lines $L_1$, $L'_2$, $L_3$ and $L'_1$, $L_2$, $L'_3$ are connected with star points S and S' via resistors R1, R2, R3 and R4, R5, R6, respectively. Resistors R1–R6 all have the same resistance value. Therefore, star point S has the arithmetic mean value of the potentials of $L_1$, $L'_2$, $L_3$ and star point S' the mean value of potentials $L'_1$, $L_2$, $L'_3$. A voltage between both star points S, S' charges a capacitor $C_6$ and is fed to an optical coupling 2.

Within optical coupling 2, a LED is driven by the star point voltage and produces a light signal representing said voltage. A photo diode receives said light signal and is changed in its resistance value responsive to said light signal and thus responsive to said star point voltage. The terminals of the photodiode represent an output side of optical coupling 2.

A power supply circuit 4 comprising a rectifier is connected to two of said lines, e.g. to $L_1$ and $L_2$. A transformer could be included, as mentioned above. An output DC voltage of power supply circuit 4 is fed to one output terminal of optical coupling 2 via a signal lamp circuit 3 for optical signalizing a current. The other output terminal of optical coupling 2 is grounded via a capacitor $C_1$ and a parallel resistor $R_7$ and fed to a gate terminal of a FET the source terminal of which is grounded. A relay 5 is connected between a drain terminal of the FET and said output terminal of optical coupling 2 fed with the DC potential of power supply circuit 4. Relay 5 simultaneously opens and closes two relay switches 6, 7. According to the results of the inventors, a FET has proven to be advantageous compared to other transistor types.

The operation of monitor circuit 1 is as follows: If any one or any two of PTC resistors PTC1–PTC3 or all three trigger, i.e. change their resistance from a low to a high value responsive to a current higher than a certain threshold value, capacitor C6 between star points S. S' charges to a substantial voltage within a certain time period. This voltage of capacitor C6 leads to a low resistance of the output side of optical coupling 2. Thereby, the gate of the FET is drawn to the DC potential of power supply circuit 4. Capacitor C1 and resistor $R_7$ provide for a certain time delay in the gate voltage swing of the FET whereas the optical coupling 2 provides for a galvanic separation from the potentials at capacitor C6. This galvanic separation is advantageous in two respects: First, the DC side of power supply circuit 4 can be related to ground potential whereas star points S, S' can principally have a floating potential, i.e. only the voltage between star points S, S' is measured independent of their absolute potential. Second, the high potentials of three-phase line L, L' are galvanically separated from the right hand side in FIG. 1. In this respect, power supply circuit 4 can include a separation transformer on the AC side.

The gate voltage swing renders the FET conductive leading to a current flow through a winding of relay 5 and through lamp 3. Consequently, lamp 3 signalizes the triggered status of the three-phase PTC resistor and relay 5 starts its switching action, i.e. closes normally-off switch 6 and opens normally-on switch 7. These two switches 6, 7 are provided for in order to meet various applications with one standard monitor circuit The switching action of relay 5 is the signal of monitor circuit 1. Due to resistor $R_7$ the fuse monitor is automatically reset after operation as the PTC resistors.

It is to be noted that the signalizing function of lamp 3 and the switching action of relay 5 do not depend on the details of which one or two single phase PTC resistors PTC1–PTC3 or whether all three have been triggered. The response time of the monitor circuit and its sensibility to disturbances on line L, L', e.g. during start-up of motor M, can be tuned by the capacitance values of capacitors C6 and C1 and the value of $R_7$. According to the results of the inventors, capacitor C1 and resistor $R_7$ are preferably used to tune the detection time period whereas capacitor C6 is used to improve the disturbance insensitivity of monitor circuit 1 especially during motor start up. Concerning the detection time period, the inventors have found that in most cases it is appropriate to wait for at least one or two half-waves after the time of status change of three-phase PTC resistor PTC1–PTC3 until relay 5 respond. In case of a 50 Hz application this corresponds to a time period of at least 10 ms or 20 ms. Further preferred values for a minimum time period are 30, 40, 60 ms. However, also time periods between e.g. 100 ms and 200 ms can be appropriate, especially in case of PTC resistors which stand even high voltages for the appropriate time period. In tuning the described time period, the gate onset voltage of the FET has to be taken into account.

Figure 2:
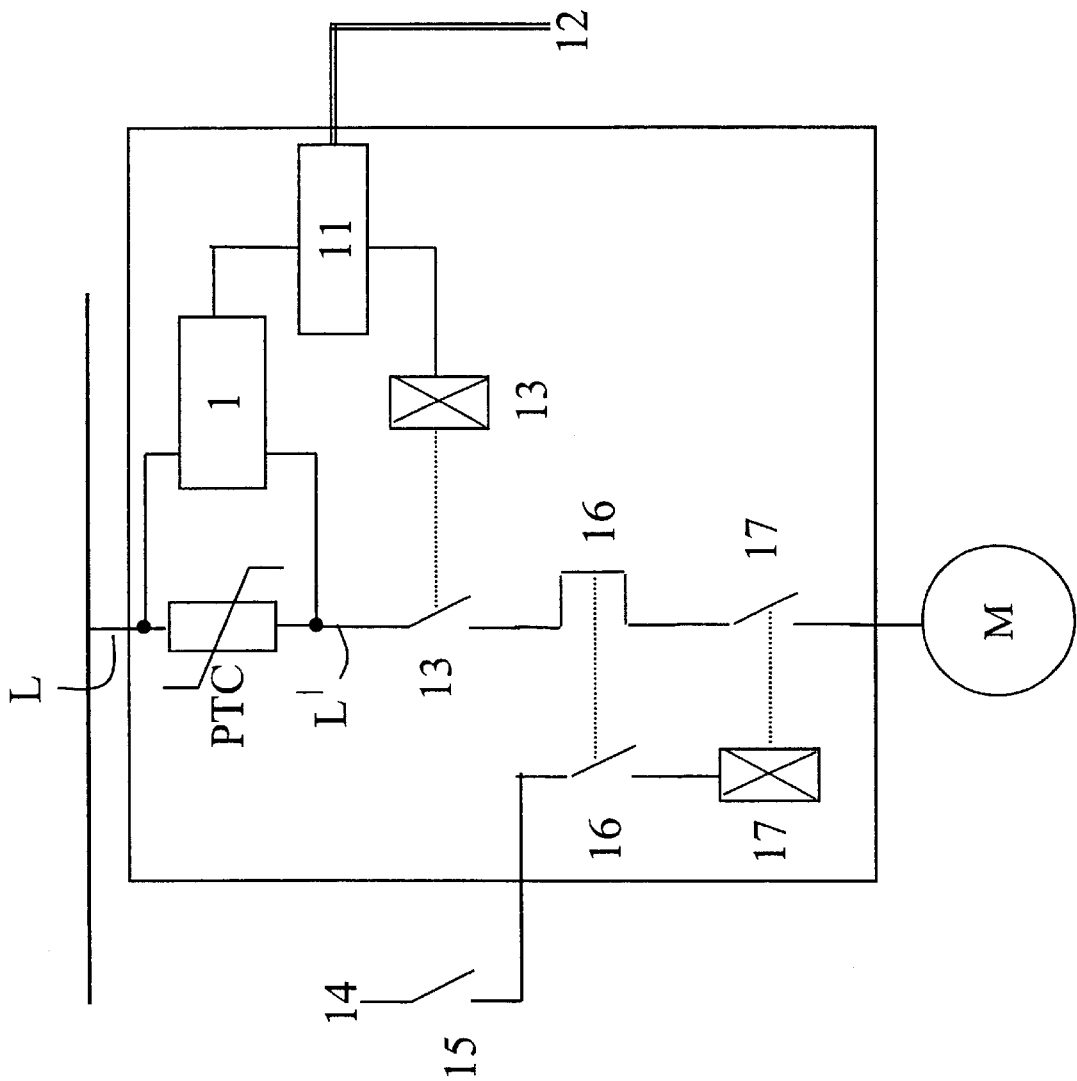
FIG. 2 shows a schematic circuit diagram of a motor power supplying and protecting circuit including the invention according to a first embodiment.

FIG. 2 shows an application of this monitor circuit in a complete power supplying and protecting system for electrical motor M. For simplicity, the schematic structure of FIG. 2 only refers to one phase in contrast to FIG. 1. However, this has to be regarded as a symbolic representation of an actual three-phase circuit.

Monitor circuit 1 monitors the star point voltage across three-phase PTC resistor PTC as discussed above. The switching action of relay 5 within monitor circuit 1 is used to produce a signal which is fed to an electronic circuit 11. Electronic circuit 11 serves as an interface for a remote control communication line referenced by numeral 12. Thereby, the monitor status can be communicated to the remote control and the remote control may be able to control the protecting system independently from monitor circuit 1 by opening a load break switch 13, to be described below, via the electronic circuit 11. Thereby, an emergency stop of electrical motor M can be accomplished independently from the electrical situation within the power supplying and protecting circuit, i.g. if the motor temperature is too high or if another emergency situation has been detected by the remote control.

Besides of this remote control, the signal of monitor circuit 1 controls the switching action of a load break switch 13 interrupting three-phase line L'. It has to be noted by the way, that in case of thermal fuses instead of PTC resistors, it would be preferred to provide for two load break switches 13, one on each side of the fuses in order to make the fuse contacts potential free for a safe exchange, namely a switch disconnector.

In the first embodiment shown in FIG. 2, load break switch 13 is followed by a standard thermal relay 16, wherein a bi-metal actuator is connected in line with load break switch 13 and controls the switching action of a contactor 17 also in line with load break switch 13 and thermal relay 16. Usually, thermal relay 16 is normally on so that a starter switch 15 power-supplied from a terminal 14 can be used to start and stop motor M by means of contactor 17, which is normally off, consequently, Starter 15, thermal relay 16 and contactor 17 are conventional art and need not to be described in detail.

Using relay 5 with normally-off switch 6 and normally-on switch 7 in monitor circuit 1 and activating a further (load break) switch 13 has the advantage, that a standard monitor circuit can be used for different applications, i.e. different types of switches 13 with different sizes and control characteristics as well as for control of one ore more switches 13. In this way, relay 5 provides for two signals of monitor is circuit 1.

Figure 3:
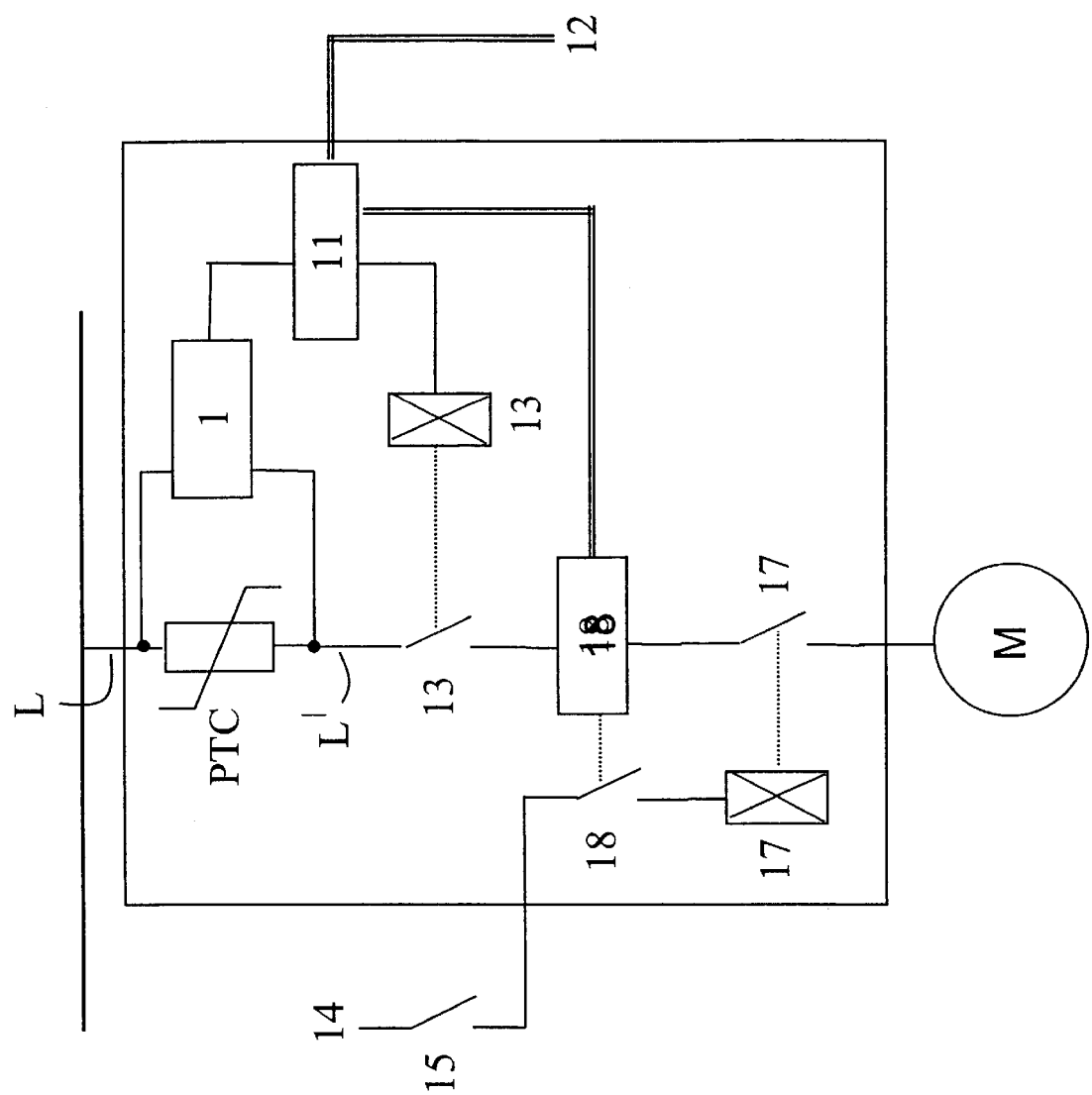
FIG. 3 shows a schematic circuit diagram of a motor power supplying and protecting circuit including the invention according to a second embodiment.

FIG. 3 shows a second embodiment of the motor power supplying and protecting circuit according to the invention Therein, elements corresponding to similar elements in FIG. 2 are referenced by identical numerals. In this embodiment, bimetal relay 18 has been replaced by an electronical thermal relay 18. Thereby, also the thermal overload status can be monitored by remote control line 12. The electronical thermal overload relay 18 detects a small overcurrent, e.g. by means of a Hall sensor. The detection of small overcurrents could also be accomplished by electronic circuit 11.

Disconnector 17 could be a microrelay, it is known in the art, that Hall sensors can also be integrated in microelectronic circuits. Hence elements 17 and 18 could be one microelectronical device.

When a fault has been detected by the monitor circuit, first the line(s) can be interrupted by actuating contactor 17 via relay 18. If the contacts of contactor 17 are welded or it can not be opened within a certain time for other reasons, the load break switch can be opened for safe interruption.

Figure 4:
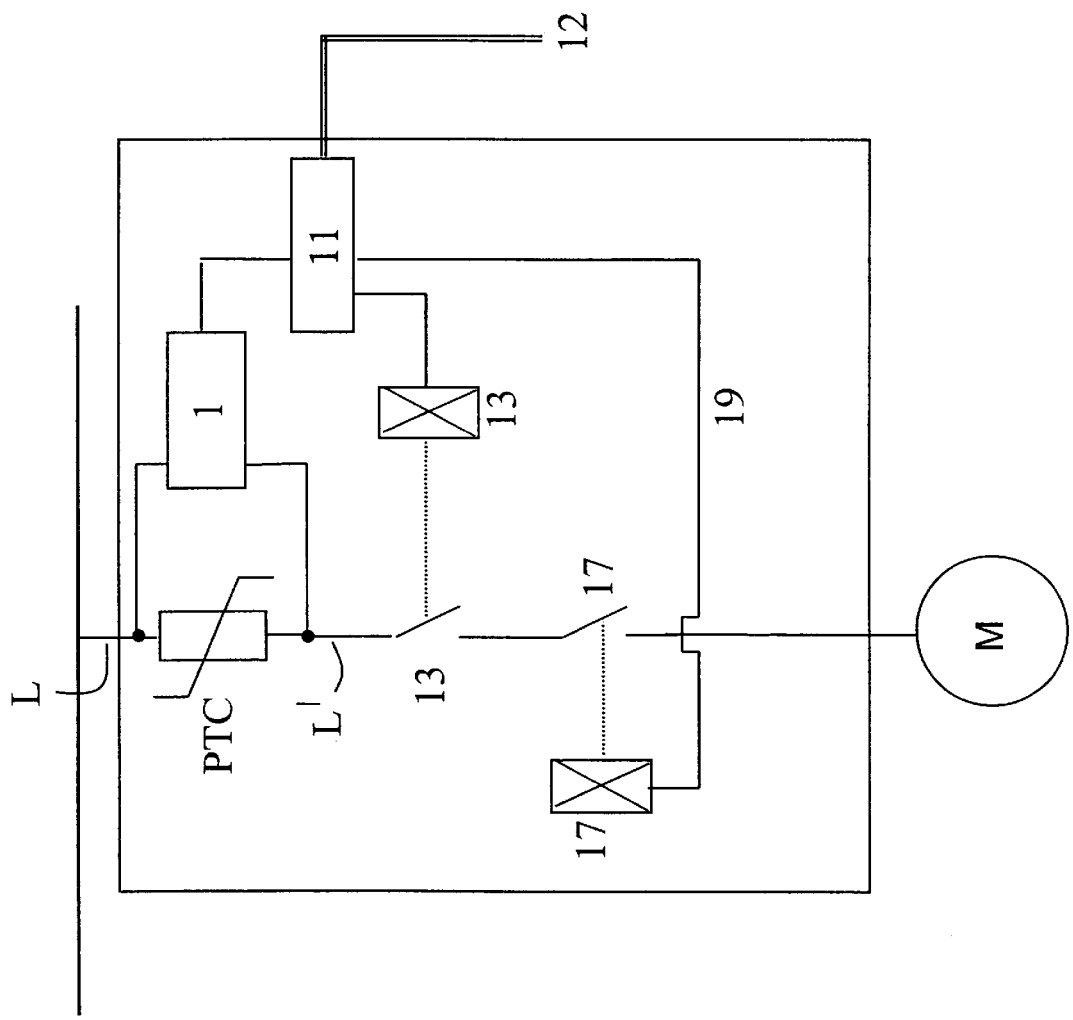
FIG. 4 shows a schematic circuit diagram of a motor power supplying and protecting circuit including the invention according to a third embodiment.

A third embodiment is shown in FIG. 4. Again, elements similar to elements in FIGS. 2 and 3 are referenced by identical numerals. Here, remote control line 12 is also used as start-up signal line. Consequently, electronic circuit 11 controls contactor 17 by means of line 19. Therefore, relay 18 of FIG. 3 need not be included. Further, electronic circuit 11 includes means for thermal overload detection, e.g. a Hall sensor, not shown in FIG. 4.

Alternatively, a thermal overload detection within electronic circuit 11 is not necessary if PTC resistor PTC is adapted to motor protection requirements, i.e. has a response characteristic adapted to the start-up current of electrical motor M. In this case, the PTC resistor on the one hand shows a sufficient response to small long-lasting overcurrents to fulfil the thermal overload protection requirements and, on the other hand, will not trigger during motor start-up.

Figure 5:
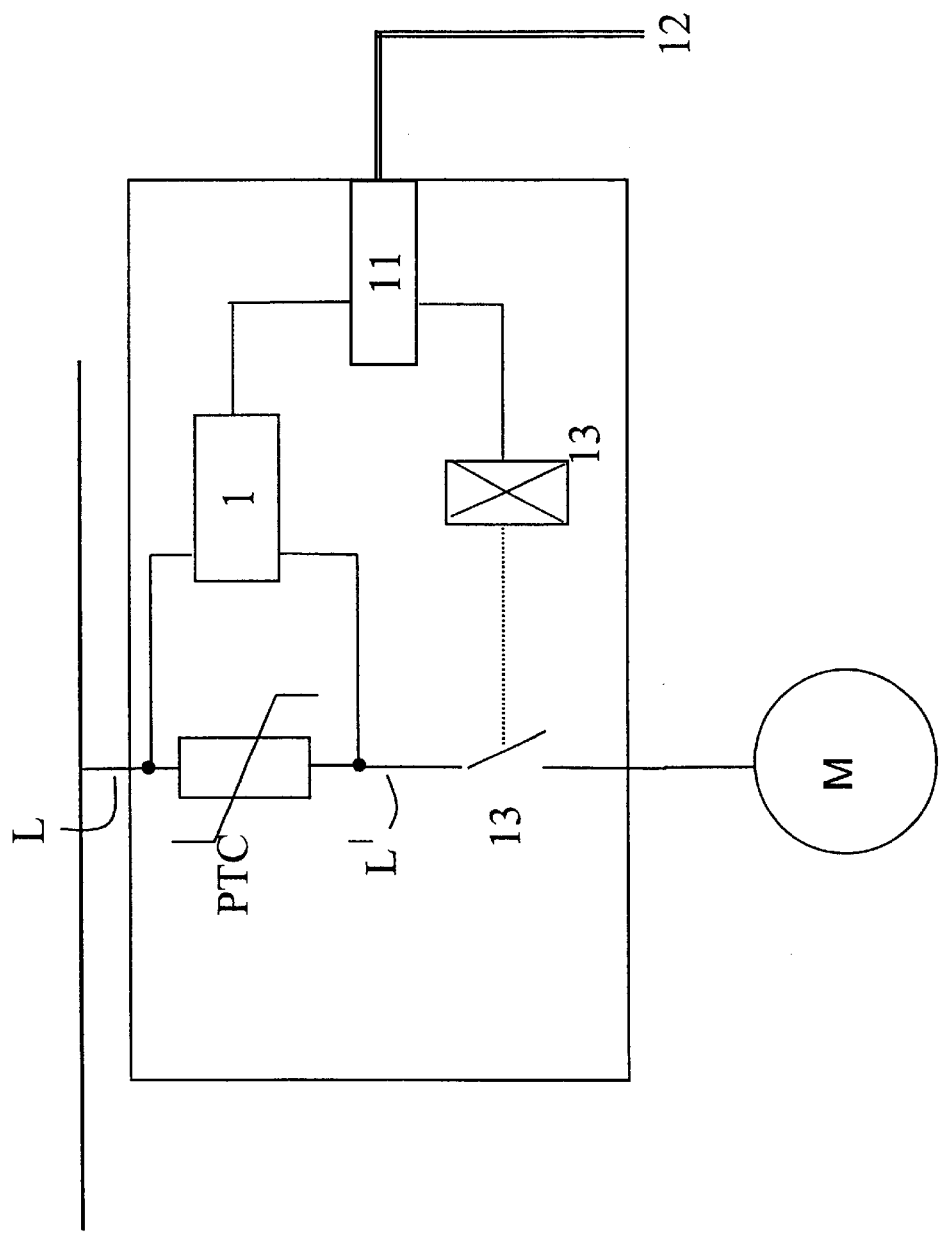
FIG. 5 shows a schematic circuit diagram of a motor power supplying and protecting circuit including the invention according to a fourth embodiment.

Finally, FIG. 5 shows a last embodiment in which like reference numerals as in the foregoing embodiments are used. However, contactor 17 has been omitted also. In this embodiment, load break switch 13 fulfils contactor requirements concerning duty cycle life (e.g. $10^7$ operations). Therefore, load break switch 13 can also be used to start and stop motor M.

What is claimed is:

1. An electric monitor circuit for monitoring a status of a three-phase current limiting device for a three-phase line comprising three one-phase current limiting means, said circuit comprising six taps, one respective tap for a first and a second side of each current limiting means, said taps being divided into two groups of three taps each, two star points, said three taps in each group being connected to one respective star point for each group via a respective resistor, and a voltage detector for detecting a voltage between said star points and producing a signal responsive to said voltage difference, wherein two taps on a first side of said current limiting device and one tap on a second side of said current limiting device are connected to one of said star points.

2. A monitor circuit according to claim 1, wherein said resistors have equal values for each group.

3. A monitor circuit according to claim 1, further comprising a three-phase switch in said three-phase line, being controlled by a control circuit responsive to said signal to interrupt said three-phase line when said signal indicates a high voltage between said star points.

4. A monitor circuit according to claim 3, wherein said three-phase switch is a load break switch.

5. A monitor circuit according to claim 4, further comprising a power supply circuit for power supplying said control circuit from said three-phase line.

6. A monitor circuit according to claim 3, wherein said control circuit is galvanically separated from said star points.

7. A monitor circuit according to claim 6, wherein said galvanic separation is effected by means of an optical coupling.

8. A monitor circuit according to claim 1, wherein said control circuit includes a capacitor and a resistor to provide for a voltage detection during a time period.

9. A monitor circuit according to claim 1, wherein said star points are connected via a capacitor for insensitivity to disturbances on said line.

10. A monitor circuit according to claim 1, further comprising a light emitting device being responsive to said signal.

11. A monitor circuit according to claim 1, wherein said current limiting means are thermal fuses.

12. A monitor circuit according to claim 1, wherein said current limiting means are PTC resistors.

13. A monitor circuit according to claim 12, wherein said PTC resistors are PTC-polymer resistors.

14. An apparatus for interrupting an electrical current in an electrical line, comprising an electrical monitor circuit according to claim 1, said three-phase current limiting device, a switch in said three-phase line and in series connection with said three-phase current limiting device, wherein said monitor circuit is adapted to, in case of a resistance change of at least one of said single-phase current limiting means, detect said voltage for a predetermined time period after said change and produce said signal only if said resistance change is present for said time period, to open said switch.

15. An apparatus according to claim 14, wherein said current limiting means are PTC resistors.

16. An apparatus according to claim 14, wherein said current limiting means are thermal fuses.

17. A circuit for power supplying and protecting an electrical motor comprising an apparatus according to claim 14.

18. A circuit for power supplying and protecting an electrical motor comprising a monitor circuit according to claim 1.

* * * * *